Nov. 12, 1929. R. FRANCK 1,735,640
METHOD OF MAKING ENDLESS WIRE FABRICS
Filed Dec. 30, 1927

INVENTOR
René Franck
BY
Andrew T. Dupont
his ATTORNEY

Patented Nov. 12, 1929

1,735,640

UNITED STATES PATENT OFFICE

RENÉ FRANCK, OF SELESTAT, FRANCE

METHOD OF MAKING ENDLESS WIRE FABRICS

Application filed December 30, 1927, Serial No. 243,778, and in France January 6, 1927.

My invention consists in a novel method for joining by means of a direct and as close as possible junction the two ends of a wire cloth for the purpose of rendering said cloth circular, or, as the term goes, "endless".

The improvements contemplated by my novel method are numerous, one of the objects being to do away with all the drawbacks involved by seams and, broadly, by all the junction systems hitherto in use for rendering wire cloth "endless". Said drawbacks, very awkward in paper, cardboard, and such like manufacturing, can be summed up as follows:

1. More or less marked opaqueness of the seamed junction portion. When, in view of greater strength, the sewing and joining wires were made thick, the holes of the meshes of the wire cloth got obturated by the big size of said sewing and joining wires. If, per contra, their thickness was reduced in view of decreasing the opaqueness of the junction there would result a decrease of the resistance of the seam and junction wires to frictional wear and tearing by traction.

2. With the soldering or brazing means for direct joining hitherto used, the soldered or brazed junction band still comprised a completely opaque width which was rather too great for proper dropping of the wet paper or cardboard sheet, due to the necessity of filling with solder all the interstices, sinuosities and recesses involved in entwining through juxtaposing or through superimposing the cloth ends, and owing to the overflowing and burrs resulting from such a filling up as the flux of the fusion metal could not always be sufficiently contained and leaded without interruption on account of the resistance it encountered when making its way through the meanders, sinuosities and the hollows, recesses or empty spaces which it should fill up regularly. Said filling, resulting from the soldering or brazing junction was therefore effected under considerable difficulties and did not always give the expected result.

My new method does away with all the above inconveniences while permitting great regularity and the width of the opaque band to be reduced according to requirements.

Figure 1:
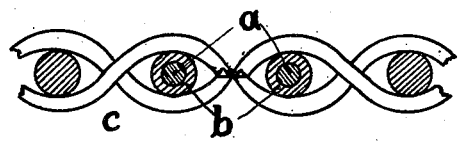
Figure 2:
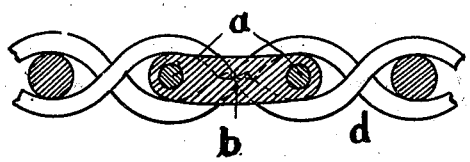

My invention is illustrated in the accompanying drawings wherein Figure 1 shows a cross-section of the wire fabric provided with special end weft-wires, before completion of the junction; Figure 2 shows the completed junction of the wire fabric after fusion of the soft metal of which my special end weft-wires are composed; and Figures 3 and 4 show a modification of the type of special weft wires employed in making the junction.

Referring to Figure 1 it will be seen that the ends $c$ and $d$ of the wire fabric are provided each with a special weft wire. This weft wire is composed of two coaxial and concentric wires $a$ and $b$, the first of which, in effect, forms a core for the other. Wire core $a$ is made of a non-fusible metal, while the outer wire $b$ is made of a softer and more fusible metal.

In Figure 1 the ends $c$ and $d$ of the wire fabric are placed in juxtaposition with the special weft wires in place, that is, woven between the end warp-wires. Heat is then applied to these ends of the fabric causing the soft wire $b$ at each end to fuse and, in flowing, to form the junction shown in Figure 2. Thus the fused metal rigidly joins the warp wires at the ends $c$ and $d$ as well as the non-fusible wires $a$ which become imbedded in the fused metal.

Figure 3:
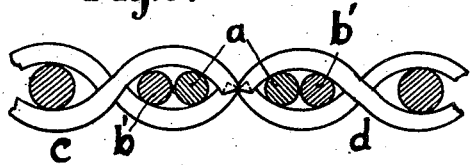
Figure 4:
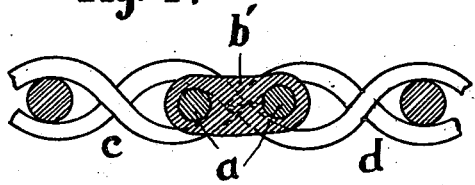

In Figure 3, instead of using coaxial end weft-wires, two wires are placed side by side throughout the width of the fabric, the non-fusible wires $a$ being in adjacent position, while the fusible wires $b'$ are on the outside of the wires $a$. In this instance, it will be noted, both sets of wires $a$ and $b'$ are solid.

Figure 3 shows the ends of the wire fabric in juxtaposition with the weft wires $a$ and $b'$ in place. After the application of heat causing the fusion of wires $b'$, the junction shown in Figure 4 is obtained.

In this case the fusing metal also joins solidly the ends of the warp wires as well as the non-fusible weft wires $a$.

My method, therefore, consists mainly in the fact that the ends of the warp wires or wires of the cloth ends are cut off or shortened so that said ends, on being juxtaposed or superposed, will form a real sort of channellization or conduit quite straight and therefore will easily be infiltrated by the fusioned metal on account of the adhesion and capillarity effects brought into play, said effects being obtainable and usable in any direction, either lateral or lengthwise or else heightwise for superposed contacts. In the latter case, the increased thickness resulting from superposition can be suppressed or reduced by compression, by hammering, or by any other adequate means.

My method furthermore consists, in view of facilitating and of limiting the abovementioned effects, in the insertion into the woven body at the two ends intended to be joined, of special weft wires to be considered as wires for channellization or leading and for adduction of soldering or brazing metal. These wires may, for instance, consist of a core of non-fusible metal coated with a fusible metal, or else of a combination of two wires, which will be inserted jointly, the one made of non-fusible metal and acting as a conduit or leading the second wire made of fusible metal, during its fusion. The fusible metal used may be of any kind, provided it will melt at a temperature lower than the melting point of the metals which the cloth is made of. The two above indicated effects may be combined or appropriated in a suitable manner according to the fineness of the cloth.

The whole of said effects, very difficult to combine, to appropriate and to handle, constitutes the realization of a highly important improvement of great practical value in the manufacturing of paper, or cardboard, and of all such like products.

Having now particularly ascertained and described the nature of my said invention as well as the manner in which the same is to be performed, I declare that what I claim is:

1. In the method of forming Fourdrinier mesh, the steps of providing end weft wires of part fusible and part non-fusible metal, weaving them into the ends of the fabric to be joined, bringing the ends of the fabric together, and then applying heat to cause the fusible metal to join the parts together.

2. In the method of forming Fourdrinier mesh, the steps of providing end weft wires, one of fusible and one of non-fusible metal, weaving them side by side into the ends of the fabric to be joined, bringing the ends of the fabric together, and then applying heat to cause the fusible metal to join the parts together.

3. In making a seamless joint for wire cloth, the process of providing metallic end weft-wires having different fusing points, inserting them side by side between the end warp-wires, bringing the ends of the fabric together, and then applying heat to cause the metallic end weft-wires of lower fusing point to join together the end warp-wires and the end weft-wires of higher fusing point.

In testimony whereof I affix my signature.

RENÉ FRANCK.